United States Patent [19]
Iino

[11] Patent Number: 5,979,393
[45] Date of Patent: Nov. 9, 1999

[54] ENGINE CONTROL UNIT MOUNTING APPARATUS FOR MOTOR VEHICLE

[75] Inventor: Tatsuo Iino, Tokyo, Japan

[73] Assignee: Fuji Jukogyo Kabushiki Kaisha, Tokyo, Japan

[21] Appl. No.: 09/007,192

[22] Filed: Jan. 15, 1998

[30] Foreign Application Priority Data

Feb. 10, 1997 [JP] Japan .................................. 9-026974

[51] Int. Cl.⁶ .............................. F02B 77/00; B60R 16/02
[52] U.S. Cl. ...................................... 123/198 E; 123/478
[58] Field of Search .............................. 123/478, 41.31, 123/198 E

[56] References Cited

U.S. PATENT DOCUMENTS

| | | | |
|---|---|---|---|
| 3,996,914 | 12/1976 | Crall et al. | 123/198 E |
| 4,275,694 | 6/1981 | Nagaishi | 123/478 |
| 4,512,314 | 4/1985 | Sakamoto et al. | 123/478 |
| 4,561,396 | 12/1985 | Sakamoto et al. | 123/198 E |
| 4,719,891 | 1/1988 | Porth et al. | 123/198 E |
| 5,094,212 | 3/1992 | Kawaguchi et al. | 123/478 |
| 5,207,186 | 5/1993 | Okita | 123/198 E |
| 5,565,712 | 10/1996 | Gaviani et al. | 123/478 |
| 5,608,632 | 3/1997 | White | 123/478 |

FOREIGN PATENT DOCUMENTS 56-5237    1/1981    Japan .

Primary Examiner—Erick R. Solis
Attorney, Agent, or Firm—Smith, Gambrell & Russell, LLP

[57] ABSTRACT

Commonly, an engine control unit is mounted in an appropriate place of the passenger compartment. According to the present invention, an engine control unit mounting apparatus for accommodating the engine control unit is directly mounted on the engine utilizing a space of the bank offset on either side of the left or right bank. The engine control unit mounting apparatus includes a material having a good heat conductivity like aluminum alloy. Its connecting terminal is directed towards the passenger compartment and as a result the electrical connection with the wiring harness of the passenger compartment becomes easy. An advantage of the present invention is to be able to shorten the length of wiring harnesses between the engine control unit and sensors, switches and actuators of the engine, and to facilitate connections with the wiring harnesses.

12 Claims, 6 Drawing Sheets

Prior Art

ENGINE CONTROL UNIT MOUNTING APPARATUS FOR MOTOR VEHICLE

BACKGROUND OF THE INVENTION

1. Field of the Invention

The present invention relates to an engine control unit mounting apparatus for a motor vehicle and more particularly to an engine control unit mounting apparatus to be mounted in an engine compartment.

2. Prior Art

Generally, as shown in FIG. 6, an engine control unit 1 for controlling fuel injection, ignition timing and the like is disposed on the inner side of a front panel 2 of the passenger compartment or on the floor of the vehicle under a seat.

However, when the engine control unit is placed in the passenger compartment, long lead wires are necessary in order to connect the engine control unit with each of the various sensors, fuel injectors, the ignitor and other actuators.

Japanese Utility Model Application Laid-open No. Jitsu-Kai-Shou 56-5237 discloses a technique in which an engine control unit is installed in the engine compartment in order to solve these problems. A major problem when installing the engine control unit in the engine compartment is how best to protect the engine control unit from heat, electromagnetic fields and electrical noises.

In this prior art, the heat problem is solved by enclosing the engine control unit with a heat insulation box and, in addition, cooling the engine control unit with fuel passing through a fuel pipe provided in the heat insulation box.

However, since the heat insulation box is around the fuel pipe, the location of the engine control unit is restricted by the placement of the fuel pipe in the engine compartment.

Also, because the engine control unit is connected with various sensors and actuators, the engine has many lead wires and connecting terminals. In modern automobiles, these lead wires and terminals are integrated into a so-called wiring harness. There is an optimum design in arranging the wiring harness in the engine compartment, and this design restricts the location of the engine control unit as well.

Therefore, it is very difficult to find the best location for the engine control unit, which is close to the fuel pipe in the engine compartment while maintaining the best design of the wiring harness.

Further, the engine control unit is enclosed by the heat insulation box, and therefore the ground terminals for the inner electrical components must be extended outside the heat insulation box. This results in a complicated construction of the heat insulation box.

SUMMARY OF THE INVENTION

With the above described problems in mind, it is an object of the present invention to provide a vehicular engine control unit mounting apparatus for allowing the length of the wiring harnesses to be minimized and for facilitating the arrangement thereof.

The above-described object can be achieved by installing the engine control unit mounting apparatus on the engine utilizing a space of an offset portion of the right bank.

Another object of the present invention is to provide an engine control unit mounting apparatus at a place where the engine control unit is not interfered with by strong electromagnetic fields or electrical noises generated from such electrical components as an alternator, an air-conditioner compressor and a battery. To achieve this object, these electrical components are disposed at a place remote from the engine control unit, i.e., at a space of another offset portion of the left bank.

A further object of the present invention is to provide an engine control unit mounting apparatus having good heat radiation performance. To attain this object, the engine control unit mounting apparatus is comprised of a good heat conductive material such as aluminum alloy.

DETAILED DESCRIPTION OF THE PREFERRED EMBODIMENT

Reference will hereinafter be made to the drawings in order to facilitate understanding of the present invention.

Figure 1:
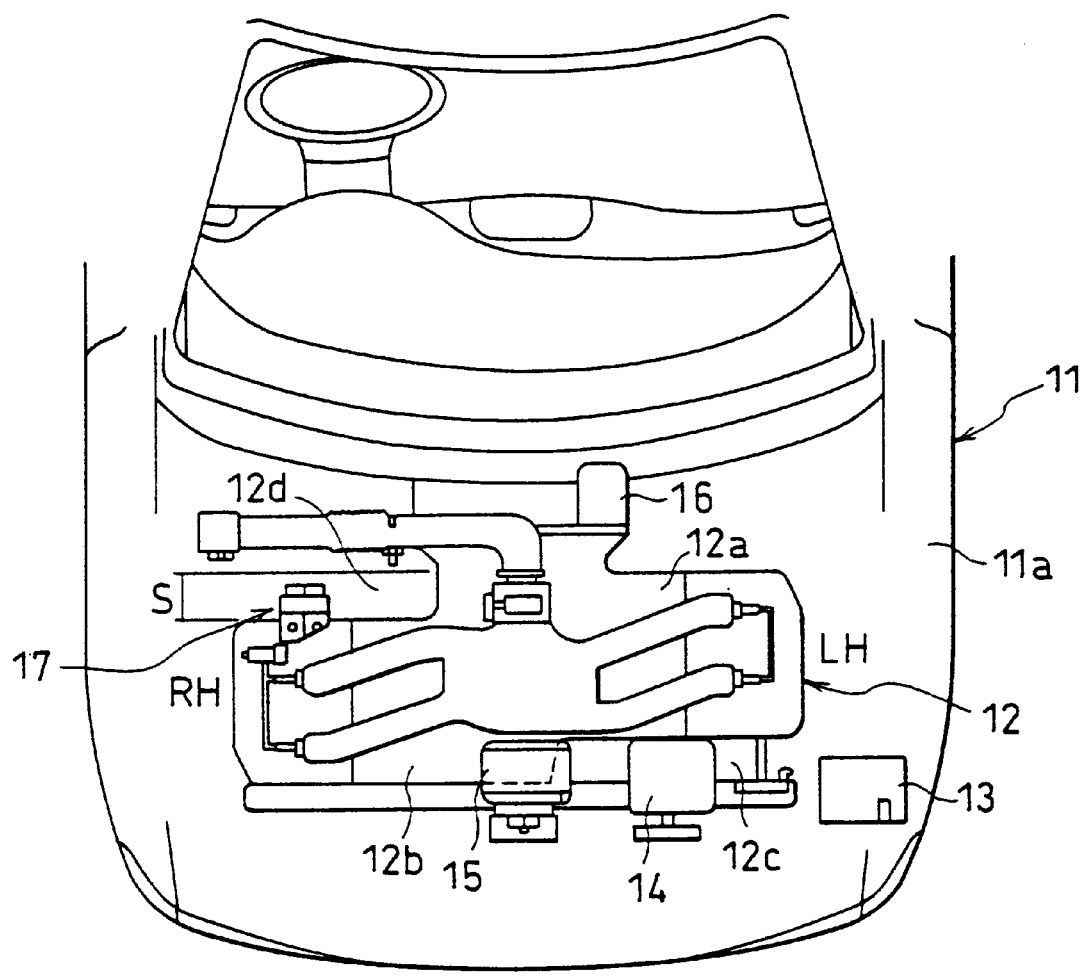
FIG. 1 is a top view showing an arrangement of an engine and surrounding equipment in an engine compartment.
Figure 2:
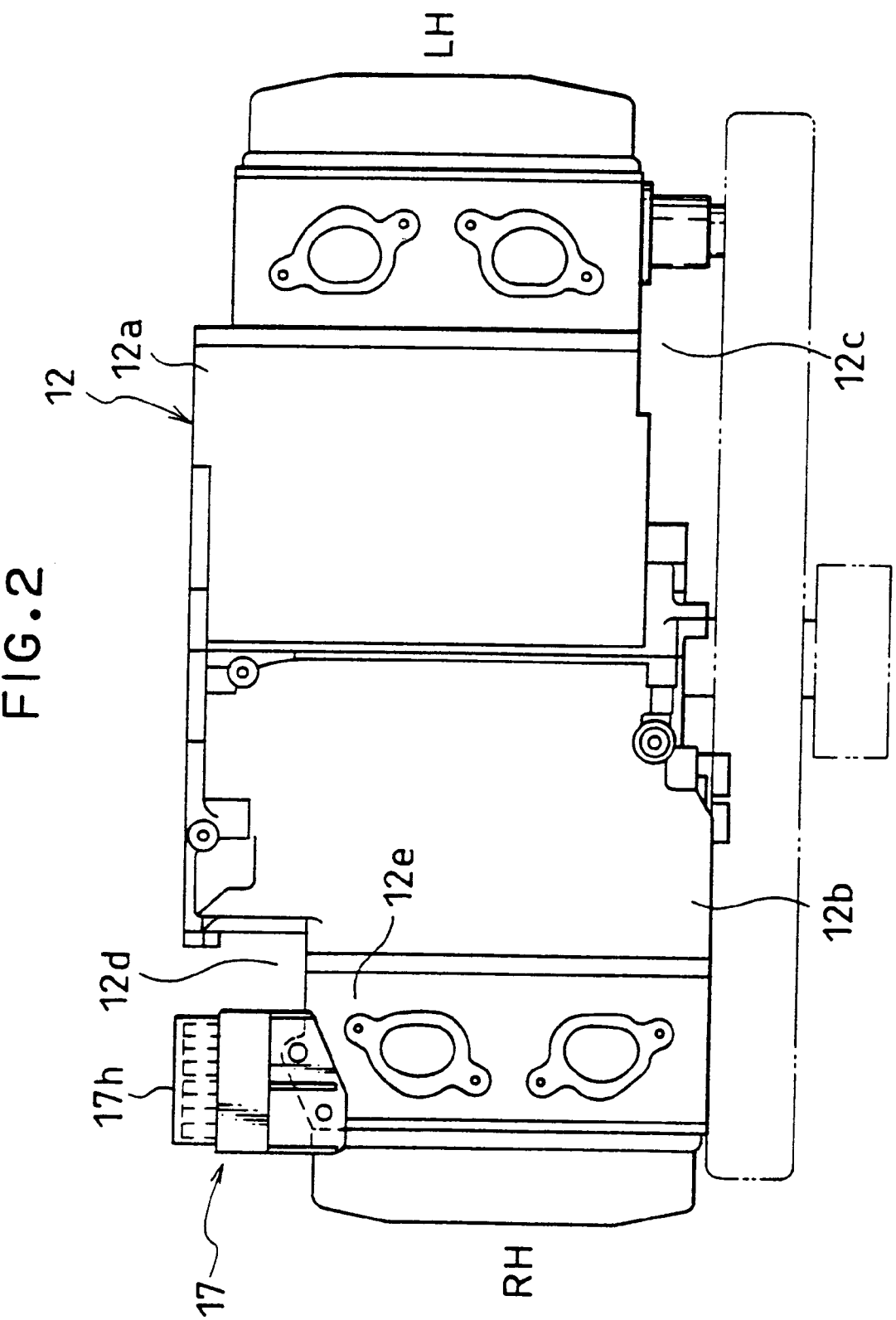
FIG. 2 is a top view showing an engine equipped with an engine control unit mounting apparatus according to the present invention.
Figure 3:
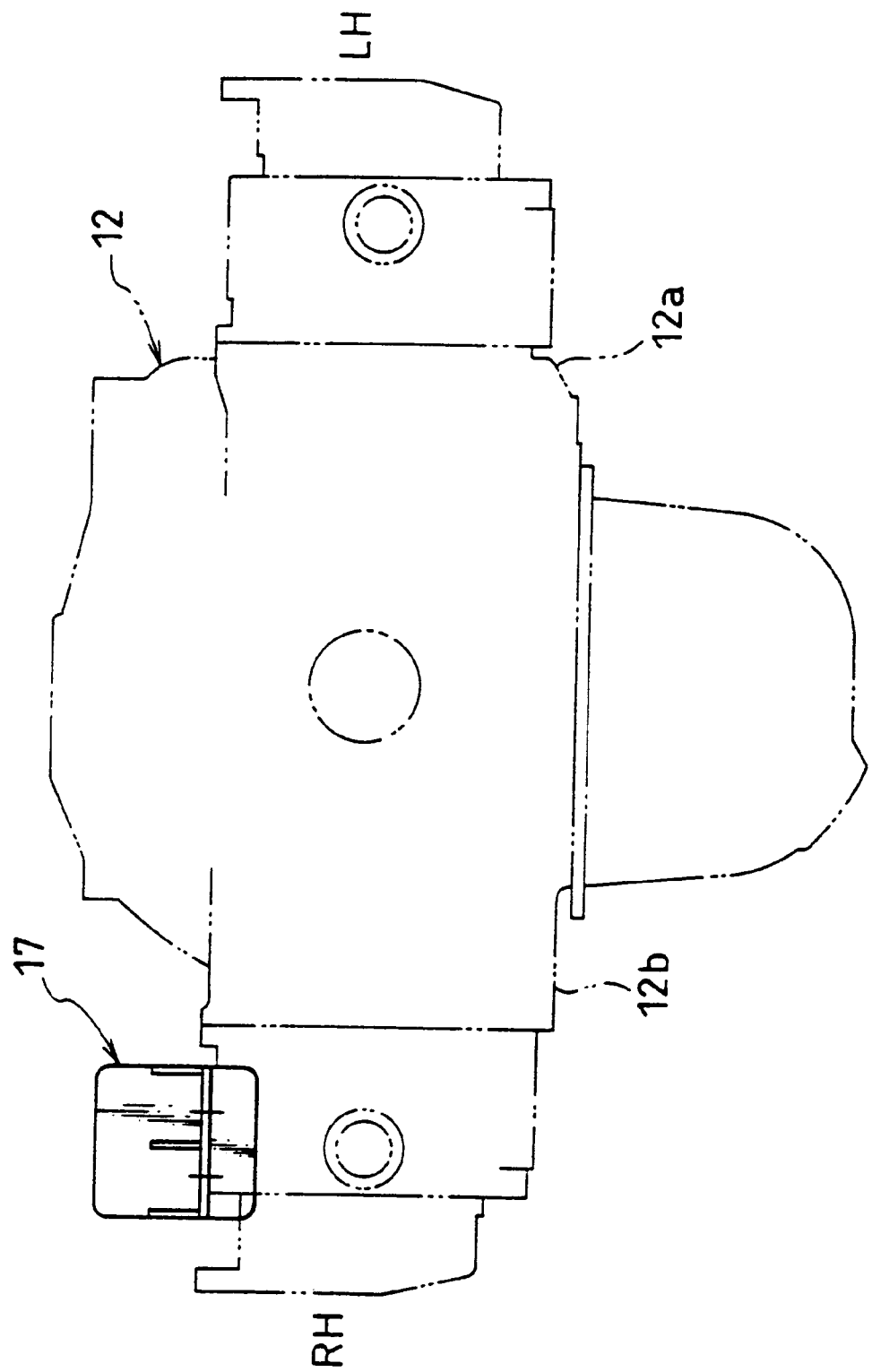
FIG. 3 is a front view showing an engine equipped with an engine control unit mounting apparatus according to the present invention.

Referring now to FIG. 1, an engine 12 is mounted longitudinally in an engine compartment 11a provided at the frontal portion of a vehicle 11. In this embodiment, the engine 12 is a horizontally opposed four cylinder engine. Since each cylinder is arranged interchangeably with respect to left-hand (LH) and right-hand (RH) banks 12a, 12b of the cylinder block, the LH bank 12a is offset with respect to the RH bank 12b in the rearward direction. As a result, a LH offset portion 12c is formed at the front end of the LH bank and a RH offset portion 12d is formed at the rear end of the RH bank.

Figure 4:
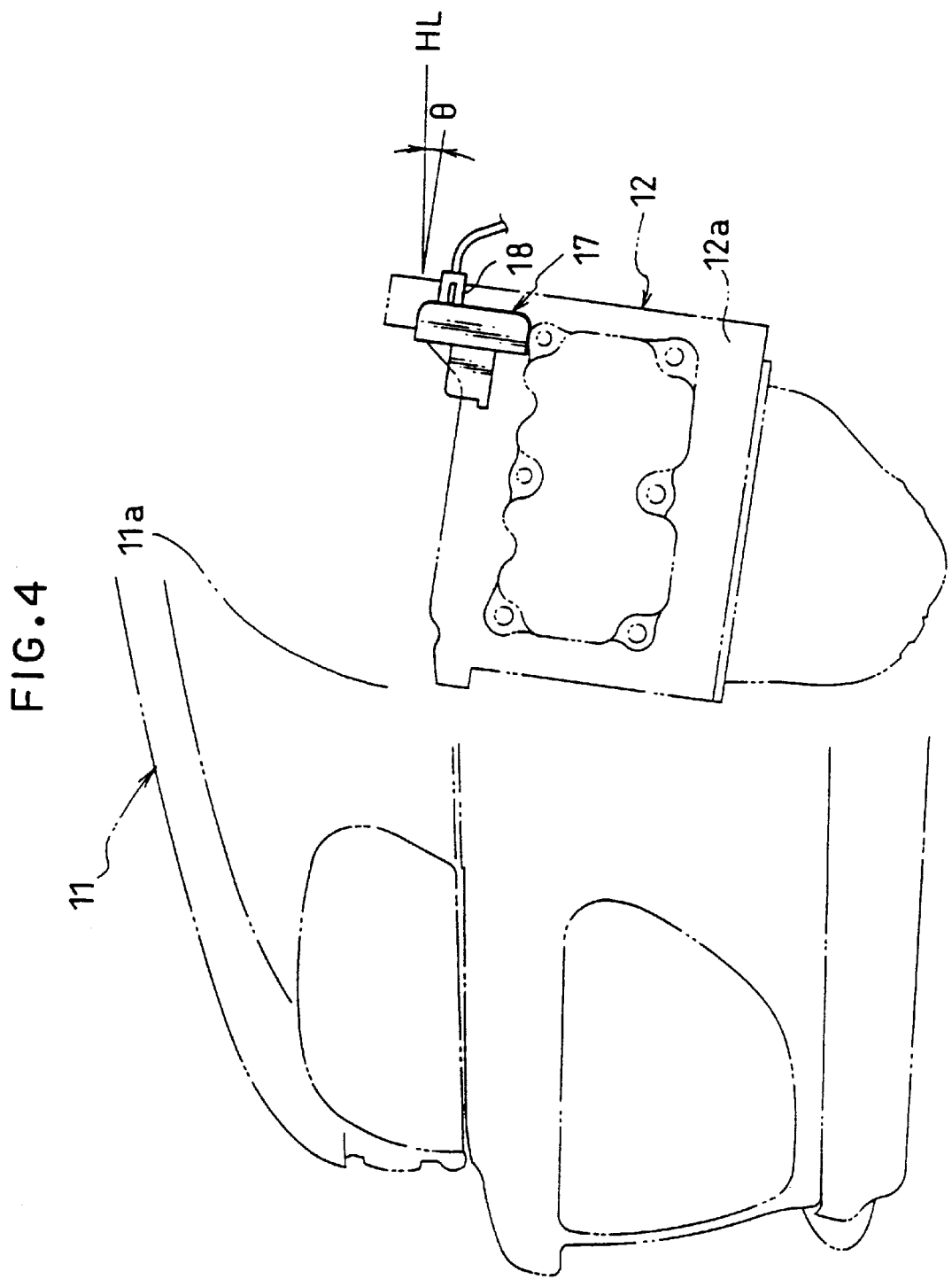
FIG. 4 is a side view showing an engine equipped with an engine control unit mounting apparatus according to the present invention.

Further, as shown in FIG. 4, the engine 12 is slanted upwardly at a specified angle θ (in this embodiment, 7 degrees) with respect to a horizontal line HL.

A battery 13 is disposed at the left front corner of the engine compartment 11a and an air-conditioner compressor 14 is disposed at the LH offset portion 12c of the engine 12. Further, an alternator 15 is mounted at the front center of the engine 12 and a starting motor 16 is mounted at the rear left end of the engine 12. This electrical equipment: the battery 13, compressor 14, alternator 15 and starting motor 16, generate strong electromagnetic fields.

Figure 5A:
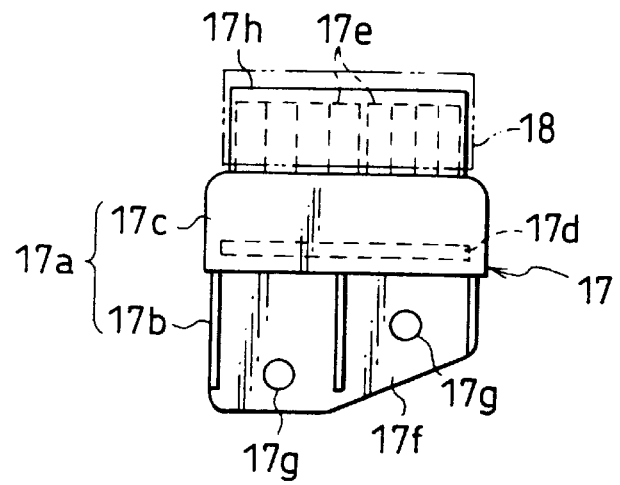
FIG. 5a is a top view of an engine control unit mounting apparatus according to the present invention.
Figure 5B:
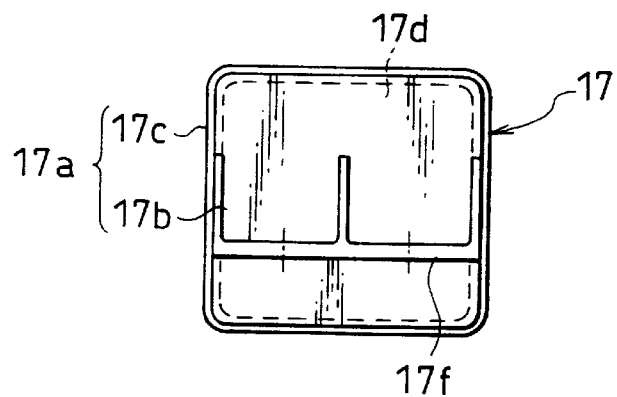
FIG. 5b is a front view of an engine control unit mounting apparatus according to the present invention.
Figure 5C:
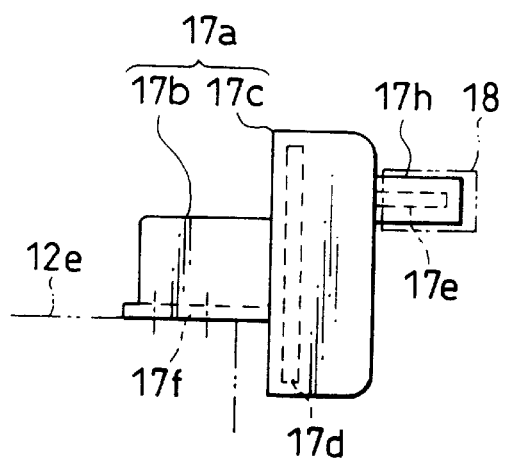
FIG. 5c is a side view of an engine control unit mounting apparatus according to the present invention.
Figure 6:
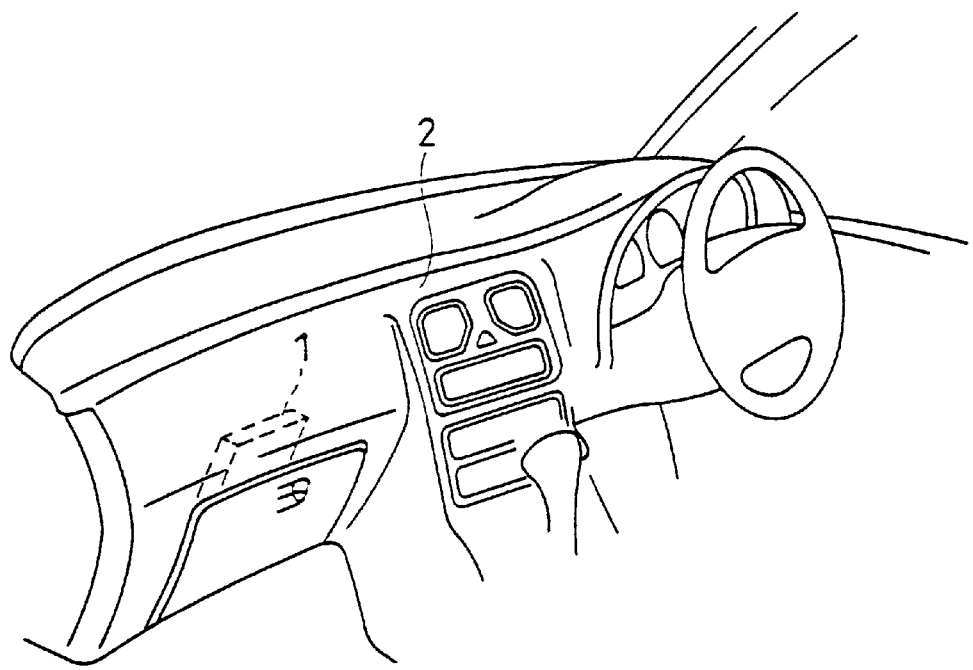
FIG. 6 is a perspective view showing an arrangement of an engine control unit according to the prior art.

An engine control unit 17 is disposed at the RH offset portion 12d of the engine 12 where there is effectively no electromagnetic field. As shown in FIG. 5a to FIG. 5b, a main body 17a of the engine control unit 17 comprises a base body 17b and a cover 17c which are made of a good conductive material like aluminum alloy.

An integrated circuit board 17d packaged by electronic components like a CPU is fixed on the base body 17b and is fully enclosed by the cover 17c. Further, a connecting terminal 17e of the integrated circuit board 17d is projected outside through a connector 17h. The connector 17h is coupled with a connector 18 connected with a wiring harness for transmitting input and output signals to and from the engine control unit 17.

Further, a bracket 17f provided at the back of the main body 17a is fastened with a bolt (not shown) on the upper surface of a RH bank cylinder head 12e of the engine 12 through a mounting hole 17g. Therefore, the engine itself is ground and no additional ground terminal is needed.

The wiring harness is composed of an engine wiring harness arranged on the engine 12 and a body wiring harness arranged along the vehicle body 11.

The engine wiring harness is connected with miscellaneous sensors, switches (for example, coolant temperature sensor, knock sensor, oil pressure sensor, throttle angle sensor, idle switch, intake manifold pressure sensor, cam angle sensor and crank angle sensor) for detecting engine operating conditions, and miscellaneous actuators (for example, fuel injector, purge solenoid valve and ignitor) for controlling fuel and ignition timing. These sensors, switches and actuators are components related to the engine control and they are arranged on the engine 12. Further, the body wiring harness is connected with components (for example, battery 13, ignition key switch, exhaust temperature sensor, starting motor 16 and transmission control unit) disposed relatively apart from the engine control unit 17.

Next, the effect of the embodiment thus constituted will be described.

When the engine control unit 17 is mounted on the engine 12, the connecting terminal 17e of the integrated circuit board 17d is directed in the rear downward direction along the slanted posture of the engine 12.

Therefore, since the connector 18 coupled with the connector 17h has the same slanted posture as the engine, water droplets stuck to the connector 18 flow from the engine control unit 17 along the slanted direction and, as a result, water droplets never soak into the inside of the engine control unit 17.

Further, since the engine control unit 17 is positioned above the RH offset portion 12d, it does not interfere with the other electric parts arranged around the engine 12, thus enabling easy access to the engine control unit for maintenance.

Further, since the engine control unit 17 is directly fixed on the engine 12, sensors, switches and actuators installed on the engine 12 can be directly connected with the engine control unit 17 so that the length of the wiring harness can be shortened. The short length of the wiring harness not only prevents the engine control unit from being hampered by noises, but also shortens the transfer time of control signals, thus leading to a high controllability and high reliability of the engine control system. The short length of the wiring harness also contributes to Lowering parts costs.

Since the engine control unit 17 is oriented toward a toe board of the passenger compartment, not only does this facilitate the connection of the engine control unit 17 with a wiring harness in the passenger compartment, it also reduces the length of the wiring harness. Further, since the engine wiring harness is not brought into the passenger compartment, the diameter of the wiring holes (holes provided on a bulkhead for wiring between the engine compartment and the passenger compartment) can be reduced, thereby ensuring a high sealing performance.

Further, since the engine control unit 17 is disposed at a place remote from where the battery 13, the air conditioner compressor 14, the alternator 15 and the starting motor 16 are located, it is possible to protect the engine control unit 17 from these electric Components which emit large magnetic fields and electrical noises.

Further, according to the present invention, since the engine control unit 17 is disposed at a place well ventilated by the air stream from the front of the vehicle, the engine control unit 17 does not become too hot. Further, the location where the engine control unit 17 is placed is well protected from splashed water or mud.

Further, since the main body 17a of the engine control unit 17 is made of a material having a good heat conductivity such as aluminum alloy, the heat radiation characteristics of the unit are good. Further, since the main body 17a is directly mounted on the engine 12, heat is transferred to the engine 12 easily through the bracket 17f. Therefore, the main body 17a is kept at a relatively low temperature.

Further, since the integrated circuit board 17d can be grounded simply by connecting the integrated circuit board 17d with the main body 17a of the unit with a lead wire, it is not necessary to attach ground wires for connecting the integrated circuit board 17d with the engine 12.

It should be noted that the engine exemplified in the preferred embodiment is not limited to a horizontally opposed engine; it may be a V-type engine. Further, in cases where the engine is mounted horizontally with respect to the longitudinal direction, the connecting terminal 17e itself may be slanted slightly downwards.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An engine system for a vehicle, comprising:
   a first cylinder bank having one or more combustion cylinders, wherein the first cylinder bank is located on a first side of an axis extending through an engine;
   a second cylinder bank having one or more combustion cylinders, wherein the second cylinder bank is located on a second side of the axis, to thereby define:
   (a) a first offset portion space at the first side of the axis and adjacent the first cylinder bank, and
   (b) a second offset portion space at the second side of the axis and adjacent the second cylinder bank;
   at least one electrical component of the vehicle mounted in the second offset portion space, wherein the electrical component generates an electromagnetic field during use; and
   an engine control unit for controlling the engine mounted in the first offset portion space, wherein the first offset portion space is defined at a diagonally opposite corner of the engine from the second offset portion space, to thereby reduce or eliminate an effect from the electromagnetic field on the engine control unit.

2. The engine system according to claim 1, wherein the engine control unit is mounted directly on the engine.

3. The engine system according to claim 1, wherein the engine control unit is mounted slanting substantially downward in direction, so that water contacting the engine control unit will flow away from the unit by force of gravity.

4. The engine system according to claim 1, wherein the axis extends through the engine substantially parallel to a forward line of travel of the vehicle and is oriented such that the first and second offset portion spaces are on a right and a left side of the vehicle, respectively.

5. The engine system according to claim 4, wherein:

the vehicle comprises a front portion and a rear portion with respect to the forward line of travel of the vehicle;

the electrical component is positioned in the offset portion nearest the front portion of the vehicle; and the engine control unit is positioned in the offset portion nearest the rear portion of the vehicle.

6. The engine system according to claim 1, wherein the engine control unit is mounted on a mounting apparatus.

7. The engine system according to claim 1, wherein the engine control unit includes an integrated circuit board mounted on a base plate and covered by a cover member.

8. The engine system according to claim 7, wherein the base plate and the cover member are made from a material that conducts heat and electricity.

9. The engine system according to claim 1, wherein the engine control unit uses the engine as an electrical ground.

10. A vehicle having an engine compartment and an engine system mounted in the engine compartment, the engine system comprising:

a first cylinder bank, having one or more combustion cylinders, wherein the first cylinder bank is located on a first side of an axis extending through an engine;

a second cylinder bank, having one or more combustion cylinders, wherein the second cylinder bank is located on a second side of the axis, to thereby define:
 (a) a first offset portion space at the first side of the axis and adjacent the first cylinder bank, and
 (b) a second offset portion space at the second side of the axis and adjacent the second cylinder bank;

at least one electrical component of the vehicle mounted in the second offset portion space, wherein the electrical component generates an electromagnetic field during use; and an engine control unit for controlling the engine mounted in the first offset portion space, wherein the first offset portion space is defined at a diagonally opposite corner of the engine from the second offset portion space, to thereby reduce or eliminate an effect from the electromagnetic field on the engine control unit.

11. The vehicle according to claim 10, wherein the axis extends in a direction of forward travel of the vehicle.

12. The vehicle according to claim 10, wherein a passenger compartment of the vehicle is closer to the first offset portion space than to the second offset portion space.

* * * * *